G. S. WITHAM, Jr.
AUTOMOBILE SEAT PROTECTOR.
APPLICATION FILED MAY 16, 1916.
1,295,662.
Patented Feb. 25, 1919.
2 SHEETS—SHEET 1.
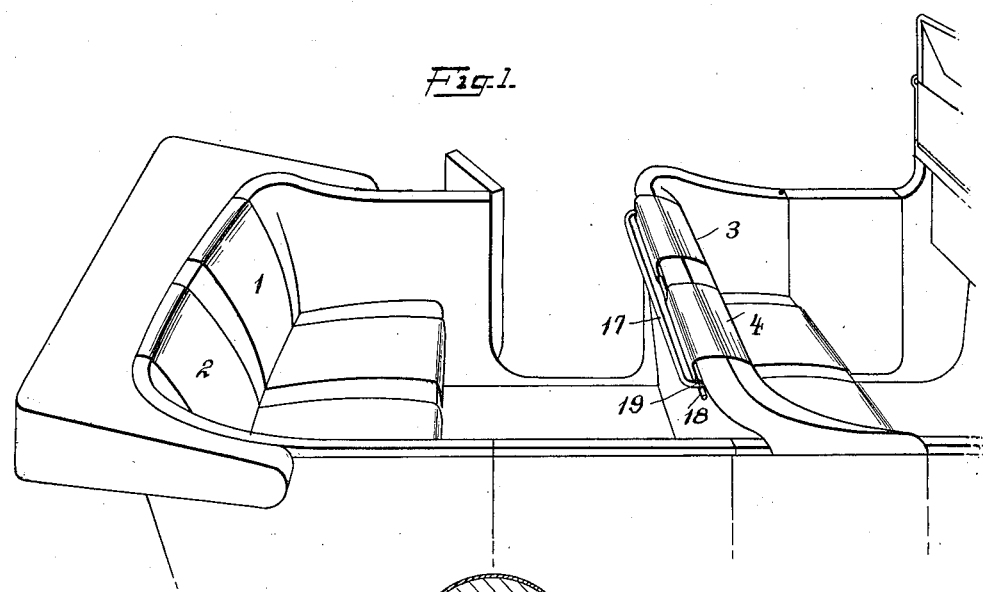
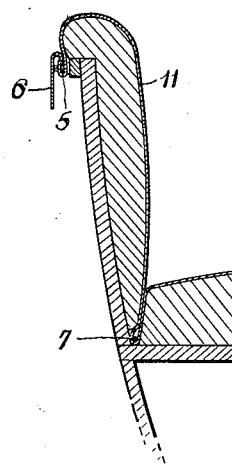
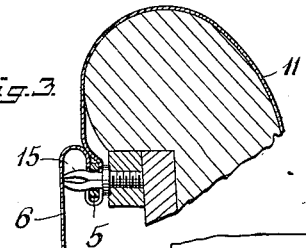
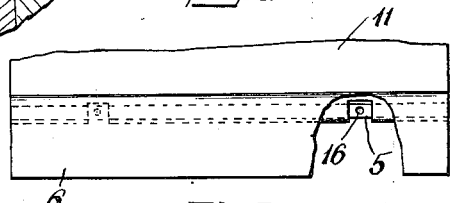
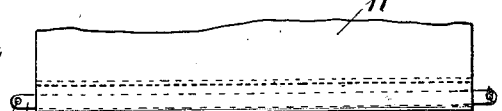
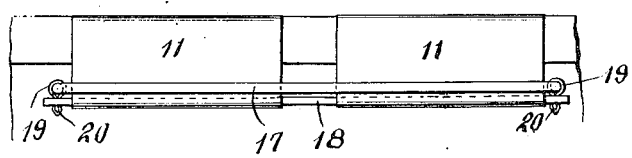
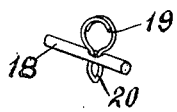
Inventor
George S. Witham Jr.
By his Attorneys
Pennie Davis Marvin

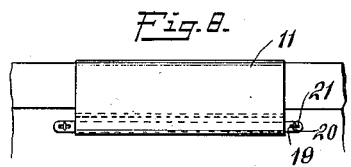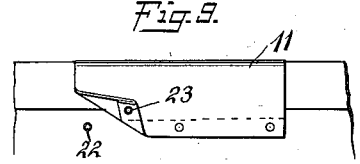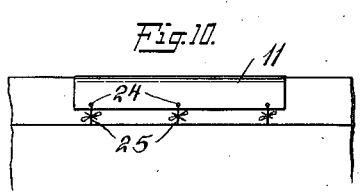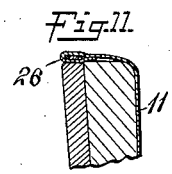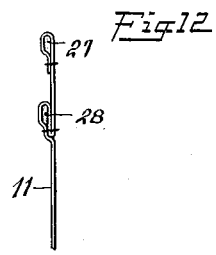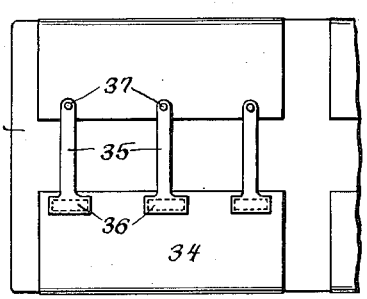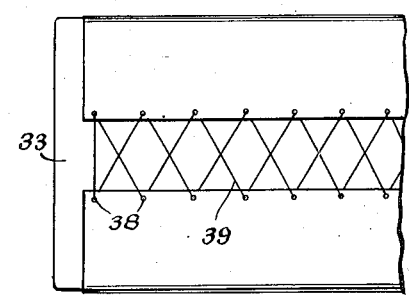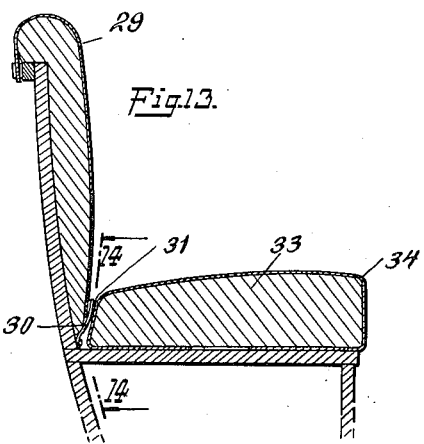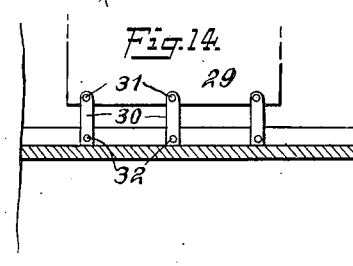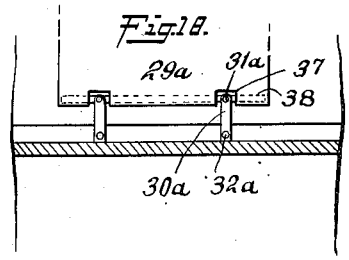

UNITED STATES PATENT OFFICE.

GEORGE S. WITHAM, JR., OF AU SABLE FORKS, NEW YORK.

AUTOMOBILE-SEAT PROTECTOR.

1,295,662. Specification of Letters Patent. Patented Feb. 25, 1919.

Application filed May 16, 1916. Serial No. 97,775.

*To all whom it may concern:*

Be it known that I, GEORGE S. WITHAM, Jr., a citizen of the United States, residing at Au Sable Forks, county of Essex, State of New York, have invented certain new and useful Improvements in Automobile-Seat Protectors; and I do hereby declare the following to be a full, clear, and exact description of the invention, such as will enable others skilled in the art to which it appertains, to make and use the same.

This invention relates to seat protectors for the seats of automobiles and it comprises a simple and inexpensive protector for such seats which can be readily attached and removed, easily and cheaply constructed, and laundried in the usual manner.

It is customary to provide the seats and backs of automobiles with leather and like upholstery which will present a pleasing appearance. Such upholstery is frequently dyed or colored so that it will harmonize or contrast with the colors of the automobile itself. Such upholstery, of course, comes in direct contact with the apparel of the person using and riding in the automobile. It frequently happens that the upholstery becomes soiled or disfigured and particularly where the automobile is exposed to unfavorable conditions, or where the mechanic or garage attendant operates the car and leaves upon the seat and back thereof the imprints of dirt and grease from his hands or clothing which has at various times come in direct contact with machinery and oil which he has handled.

In order to protect such upholstery, it has been proposed to provide the car with detachable upholstery which will cover the whole of the leather or natural upholstery of the car. This, however, in many cases, is undesirable, inasmuch as the car then has its natural upholstery entirely covered and hidden. Particularly from an esthetic viewpoint, and from the viewpoint of presenting a pleasing appearance and the color effect intended by the designers of the car, it is desirable that the natural upholstery should not be completely covered, but that it should be protected, and that the apparel of the user of the car should also be protected against such contingencies as those referred to.

The novel seat protectors of the present invention provide such a protection, which can be readily laundried and replaced, but which will nevertheless protect the apparel of the user and the upholstery of the car from the usual contaminating and disfiguring influences.

The novel protector of the present invention comprises strips of linen or other appropriate material which can be readily laundried, or which can be readily removed and replaced by fresh strips. It comprises furthermore means carried by the top or back of the seat for holding one end of the strip, and means carried by, or arranged near the seat of the car, for detachably holding the other end of the strip. The strip in turn is provided with means permitting attachment and holding both at its upper end at the top of the car back, and at its lower end at the seat of the car.

In its preferred form, the invention comprises such a strip which is continuous from the top of the back to the bottom of the back, and thence from the back of the seat to the front of the seat, and detachably held in place at all three places.

The invention will be described more in detail in connection with the embodiments thereof illustrated in the accompanying drawings, but these modifications are intended to illustrate the invention and not to define its limits.

In the accompanying drawings,—

Figure 1 shows in outline certain parts of an automobile with the invention embodied therein;

Fig. 2 is a vertical longitudinal section of the seat and back of an automobile with the invention combined therewith;

Fig. 3 is an enlarged view of the top portion of the seat back of Fig. 2;

Fig. 4 is a back view of the seat of Fig. 2 with parts broken away;

Fig. 5 shows a modified form of the end of the cover;

Fig. 6 shows a further modified embodiment of the invention as applied to the top of the cover or protector;

Fig. 7 is an enlarged detail of the clips of Fig. 6;

Figs. 8, 9 and 10, show further modifications similar to that of Fig. 6;

Fig. 11 is a detail section showing a still further modification;

Fig. 12 shows one type of end construction of the cover strips;

Fig. 13 is a section showing a further embodiment of the invention;

Fig. 14 is a view taken on the line 14, 14, of Fig. 13;

Fig. 15 shows parts of the fastener of Figs. 13 and 14;

Figs. 16, and 17 show detachable seat cushions with protectors applied thereto; and Fig. 18 shows a further modified form of the lower end of one of the protectors together with its attaching means.

Fig. 1 shows in outline, an automobile of any suitable or preferred construction, which is upholstered in the usual manner. The upholstery as is common, extends around the back and sides of the seats. According to the present invention, there is provided at the backs of the seats, strips 1, 2, 3 and 4, extending down the backs of the seats where they are usually occupied, and thence along the seat cushions, so that the occupant of the seat will be protected where his clothing comes in contact with the seat and back of the car. At the same time it will be noted that the upholstery of the car is disclosed between the strips and also at the sides of the car (where strips are not provided at the sides also). The color effect of the upholstery is thus retained and the protective strips can be made to harmonize therewith so that the whole effect is pleasing from an esthetic standpoint. The strips can thus be made of linen or other appropriate fabric, with monograms or other designs thereon, if desired, and of plain color or of any appropriate color to match the upholstery of the car or to present a contrast therewith. They may, of course, also be made of neutral colors, as the taste of the user or other practical considerations may dictate.

As illustrated in Fig. 2, a rod 5 of metal or other appropriate material is secured to the back of the car-back by fasteners 15 extending through holes in the bar 5. The fasteners 15 are shown as separate pins or screws over which the rods 5 can be snapped so that these rods are firmly held in place but can nevertheless be readily detached and removed. The rods 5 are intended to pass through hems or loops in the strip 11 and to hold this strip firmly at its upper end. In practice, apron portions 6 may be provided as integral extensions of the strips to hide the fastener by which the strip is held. Where the holes in the rod 5 are intermediate its ends, the strip can be cut away as indicated in Fig. 4 to permit passage of the fasteners through these holes in the rod. These holes may, however, be at the ends of the rod or strip as illustrated in Fig. 5 in which case the strip may terminate in an ordinary hem or loop through which the rod passes. The holes through which the fasteners 15 pass are indicated in 16 in Fig. 4, and 16ª in Fig. 5, the rod of Fig. 5 being indicated at 5ª.

In Fig. 6, another method of attaching the top of the strips is shown. In this case, the usual robe rail is indicated at 17 and the rod 18 is secured thereto by the spring clips and snaps 19 which encircle the robe rail and extend through openings in the rod 18. The clips 19 have their lower portions 20 properly proportioned to hold the rod 18 securely thereupon. The specific construction of these clips illustrated is intended to be merely illustrative, and any suitable clip or means of securing the rod 18 to the rail 17 will operate in a similar manner.

It will be noted from Fig. 2 that the strips 11, which correspond to the strips 1, 2, 3 and 4, of Fig. 1, extend down between the seat cushion and back cushion and are secured at this place by a rod 7 which is in turn secured to the automobile in any suitable manner. After extending around this rod 7, the strip 11 then continues over the seat cushion at 12 and is held at its lower end by means of a rod 8 yieldably held by a spring member illustrated conventionally at 9, which is in turn secured at 10 to some fixed part of the automobile. The rod 8 passes through a loop in the lower end of the strip 11. Below this strip is a curtain or apron portion 13 to cover up the elements 9 and 10 where this is desired. A further loop 14 is also shown through which the rod 8 may pass so that the strip is capable of adjustment to seats of larger or smaller size. The spring or elastic members 9 also provide for more or less adjustment of the cover or protector to the seat, while the spring or elastic members also serve to hold the protector taut and to take up wrinkled portions thereof.

In Fig. 8, the strip 11 is secured at its upper end to the rod 19 which has slots 20 adapted to pass over and be secured by turnbuttons 21. In Fig. 9 the upper end of the strip 11 and the back of the seat back are provided with ball and socket fasteners 22 and 23. In Fig. 10, the top of the seat back is provided with strings or cords 25 passing through holes 24 in the end of the strip 11. In Fig. 11 a rod 26 which passes through the loop in the strip 11 is secured to the top of the back, instead of to the back side thereof.

In Fig. 12 the strip 11 is shown as provided with two loops 27 and 28 through either of which the securing rod can pass. Provision for adjustment and for adapting the strip to seats of different size is thus made, while the upper end of the strip serves as an apron portion when the rod passes through the loop 28.

In Fig. 13 the strip 29 extends only to the bottom of the back and is secured thereto by strips 30 which are preferably elastic and which are secured to the automobile by screws or tacks or other suitable means 32 and to the strip 29 by detachable fasteners such as ball and socket fasteners 31.

Where the strip extends only to the bottom of the back of the seat, and where the seat cushion is detachable, this seat cushion may be provided with its own independent strips which are passed around the cushion and suitably secured thereto. Fig. 16 shows a strip 34 passing around the seat cushion and having its end secured together by strips 35, preferably elastic, secured at 36 to one end of the strip and by buttons or ball and socket fasteners 37 to the other end. In Fig. 17 the cushion 33 is provided with a similar strip protector the ends of which are held in place by a lacing 39 secured to holes 38 of the protector.

Fig. 18 shows a modified arrangement of the lower end of one of the strips, the rod 38 being passed through a loop in the strip and the elastic or other members 30$^a$ being secured at their lower end 32$^a$ to the car and at their upper end at 31$^a$ to the rod 38. The strip 29$^a$ is shown as cut away to permit access to the rod intermediate its ends.

It will be noted that the invention is characterized by the provision of a protective strip which is secured at its upper and lower ends to the automobile back, and, where this strip extends also over the seat cushion, to the automobile at the front of this cushion. It will also be noted that means is provided on the automobile for holding this strip detachably in place at both its upper and lower ends. The strips are nevertheless readily removable, while they are firmly held in place when in use. It is desirable, though not in all cases essential, that the strips should be drawn taut and held taut by yieldable fasteners at their lower ends. The strips will, however, naturally tend to adhere to the upholstery over which they are stretched and to accommodate themselves to the changes in the contour of the cushion caused by the car occupants.

It will thus be noted that the present invention provides a simple and inexpensive, but nevertheless effective and pleasing protector for the upholstery of the automobile which has the advantage that it is readily removed and replaced and laundried, and which has the further advantage that it leaves much of the natural upholstery of the car freely exposed. The upholstery is, nevertheless, protected where protection is most desired. Furthermore, inasmuch as the strips are readily removable, a soiled strip can be quickly replaced should this become desirable. Inasmuch as the strips are of relatively thin material, they can be folded into small space and a supply of them can be carried in the usual hamper or pockets of the car.

I claim:

1. An automobile seat protector comprising a strip of fabric of uniform width extending over the top of the back of an automobile seat and over the front edge of the seat, the ends of the fabric that extend over the top of the seat back and over the front edge of the seat being each formed with a fold, rods passing through each of the folds, fastening devices mounted on the rear edge of the top of the seat back and adapted to pass through apertures in the corresponding rod, yieldable fastening devices attached to the front of the seat and adapted to be connected to the rod located in the fold at the front edge of the seat, and the upper and lower ends of said fabric being extended beyond the folds to form apron portions for concealing the fastening devices.

2. An automobile seat protector comprising a strip of fabric of uniform width extending over the top of the back of an automobile seat and over the front edge of the seat and being folded between the back and the seat, the portion of the fabric that extends over the top of the seat back and the portion extending over the front edge of the seat being each formed with a fold, retaining rods passing through each of the folds and through the folded portion between the back and the seat, fastening buttons mounted on the rear edge of the top of the seat back and adapted to pass through apertures in the rod placed in the fold at the corresponding end of the fabric, springs attached to the front of the seat and adapted to be connected to the rod located in the fold at the corresponding end of the fabric, and the ends of said fabric being extended beyond the folds at the top of the seat back and at the front edge of the seat to form apron portions for concealing the fastening devices.

In testimony whereof I affix my signature, in presence of two witnesses.

GEORGE S. WITHAM, Jr.

Witnesses:
 NELLIE S. MOORE,
 LOU A. WITHAM.